United States Patent [19]

Matsuo

[11] Patent Number: 5,236,401
[45] Date of Patent: Aug. 17, 1993

[54] DRIVING BELT FOR STEPLESS SPEED VARIATION

[75] Inventor: Mu Matsuo, Shizuoka, Japan

[73] Assignee: Matsumoto Sangyo Kabushiki Kaisha, Japan

[21] Appl. No.: 874,177

[22] Filed: Apr. 24, 1992

[51] Int. Cl.⁵ ............................................. F16H 5/16
[52] U.S. Cl. .................................................. 474/242
[58] Field of Search ........ 474/201, 206, 207, 212-217, 474/237, 240-245

[56] References Cited

U.S. PATENT DOCUMENTS

| | | | |
|---|---|---|---|
| 4,457,742 | 7/1984 | Hattori et al. | 474/242 X |
| 4,790,798 | 12/1988 | Hattori | 474/242 |
| 4,854,926 | 8/1989 | Hattori | 474/201 |
| 4,891,039 | 1/1990 | Hattori et al. | 474/242 |

*Primary Examiner*—Thuy M. Bui
*Attorney, Agent, or Firm*—Steinberg & Raskin

[57] ABSTRACT

A driving belt for stepless speed variation capable of smoothly traveling and accomplishing power transmission with high efficiency. The driving belt includes an endless metal strip consisting of a plurality of first metal strip elements and a second metal strip element formed into a length larger than the first metal strip elements, a plurality of blocks each provided at a center of an upper portion thereof with a groove through which the endless belt is fittedly inserted and having both side surfaces in a direction of advance of the driving belt curved, and a plurality of pins each arranged so as to extend across the groove of the block. The second metal strip element is formed into a corrugated shape, resulting in exhibiting elastic force and the both side surfaces each are formed so as to have a center of curvature defined at an intermediate position of a depth of the groove, so that the blocks adjacent to each other may abut against each other near the metal strip.

6 Claims, 2 Drawing Sheets

DRIVING BELT FOR STEPLESS SPEED VARIATION

BACKGROUND OF THE INVENTION

This invention relates to a driving belt for continuous or stepless speed variation, and more particularly to a driving belt for stepless speed variation which is used for a belt-driven stepless speed change gear or the like.

A driving belt for stepless speed variation which has been conventionally known in the art is essentially constructed in such a manner as shown in FIG. 1. More particularly, the conventional driving belt for such a purpose generally includes a plurality of endless metal strips 100 laminated together and a plurality of plate-like carriers 102. The carriers 102 each are formed with a groove 104 through which the metal strips 100 are fittedly inserted. Also, each of the carriers 102 is provided on one side thereof in a direction of advance of the belt with a projection 106 and on the other side thereof with a recess 108 in a manner to positionally correspond to each other and mate in configuration with each other. Further, each of the carriers 102 is formed at a lower portion thereof with a tapered surface 110 so as to cause the lower portion to be downward tapered. The carriers 102 thus formed are so arranged that the projections 106 and recesses 108 are alternately fitted in order, resulting in being continuously arranged in a row on the endless metal strip 100.

The conventional driving belt constructed as described above is so operated that when each of the carriers 102 passes through a pulley, opposite surfaces of the carriers adjacent to each other which are contacted with each other start to be separated from each other, so that forward one of the adjacent carriers 102 in the direction of advance of the belt is pivotally moved about an upper end of the tapered surface 110 of the rearward carrier 102. This causes outer peripheral portions of the adjacent carriers 102 to be separated from each other, resulting in any displacement or deviation occurring in the engagement between the opposite projection 106 and recess 108 of the adjacent carriers 102 opposite to each other as shown in FIG. 1, so that interference readily occurs between the adjacent carriers. Also, this causes any slippage to occur between the carriers 102 and the metal strips 100, leading to generation of heat and wearing due to friction therebetween, so that power transmission through the driving belt is significantly deteriorated. It is a matter of course that clearance is provided between the metal strip 100 and the groove 104 and between the projection 106 and the recess 108. However, excessive clearance increases backlash of the carriers 102, to thereby cause the carriers to strike against the pulley to generate noise when they pass through the pulley; whereas insufficient clearance causes the carriers 210 to mesh with each other also in proximity to the pulley, resulting in a failure in rotation of the metal strips 100. Therefore, it is required to manufacture the carriers 102 with extremely high accuracy. Also, the clearance is increased with use to lead to the disadvantage indicated above.

Furthermore, the conventional driving belt requires to provide clearance sufficient to ensure rotation of the belt when a number of the carriers 102 are continuously arranged on the metal strips 100 in a longitudinal direction of the belt. Unfortunately, in this instance, a decrease in rotational speed of the pulley causes the clearance which is one-sided during rotation of the pulley to be varied to instantly generate backlash of the carriers 102, leading to vibration of the belt.

SUMMARY OF THE INVENTION

The present invention has been made in view of the foregoing disadvantage of the prior art.

Accordingly, it is an object of the present invention to provide a driving belt for stepless speed variation which is capable of reducing slippage or skid and vibration to restrain generation of noise and ensure smooth traveling of the belt.

It is another object of the present invention to provide a driving belt for stepless speed variation which is capable of accomplishing power transmission with high efficiency.

In accordance with the present invention, a driving belt for stepless speed variation is provided. The driving belt includes an endless metal strip including at least one first metal strip element and a second metal strip element formed into a length larger than the first metal strip element. A plurality of the first metal strips may be laminated on one another. The driving belt also includes a plurality of blocks each provided at a center of an upper portion thereof with a groove through which the endless belt is fittedly inserted and having both surfaces in a direction of advance of the driving belt curved and a plurality of pins each arranged so as to extend across the groove of the block.

In a preferred embodiment of the present invention, the second metal strip element is formed into a corrugated shape.

In a preferred embodiment of the present invention, both surfaces of the block each have a center of curvature defined at an intermediate position of a depth of the groove.

In a preferred embodiment of the present invention, both surfaces of the block are convexly curved.

In a preferred embodiment of the present invention, the second metal strip element is arranged between the pins and the first metal strip element.

In a preferred embodiment of the present invention, the pins each are inserted into the block through the groove to downward press the metal strip received in the block.

BRIEF DESCRIPTION OF THE DRAWINGS

These other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 3:
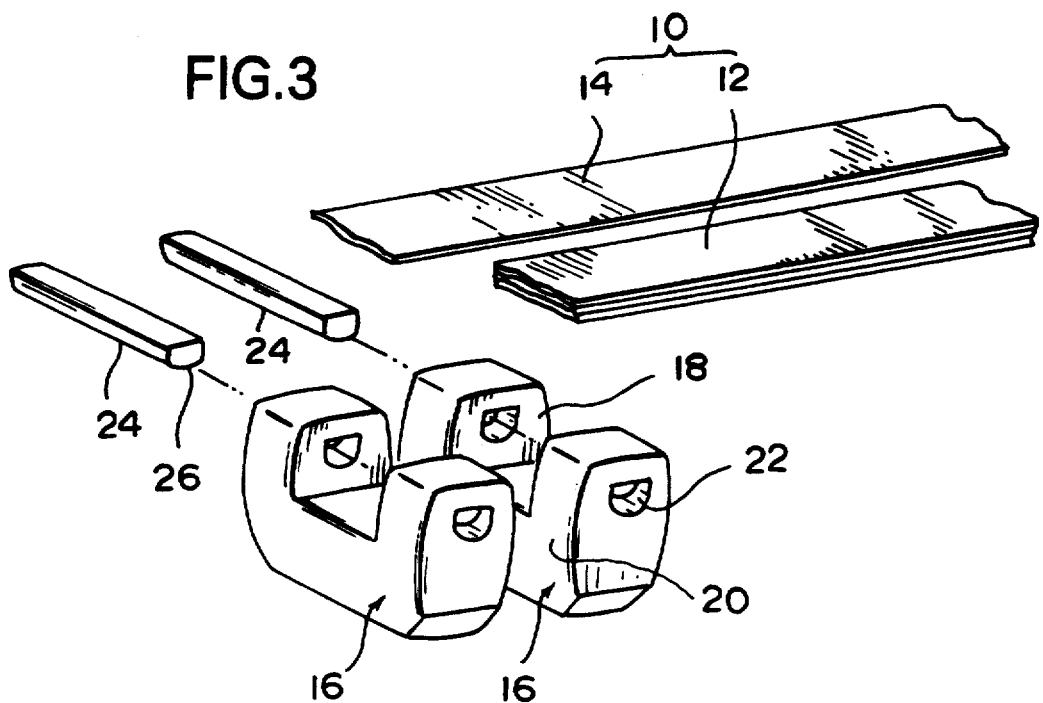
FIG. 3 is an exploded perspective view showing an essential part of the driving belt of FIG. 2.
Figure 4:
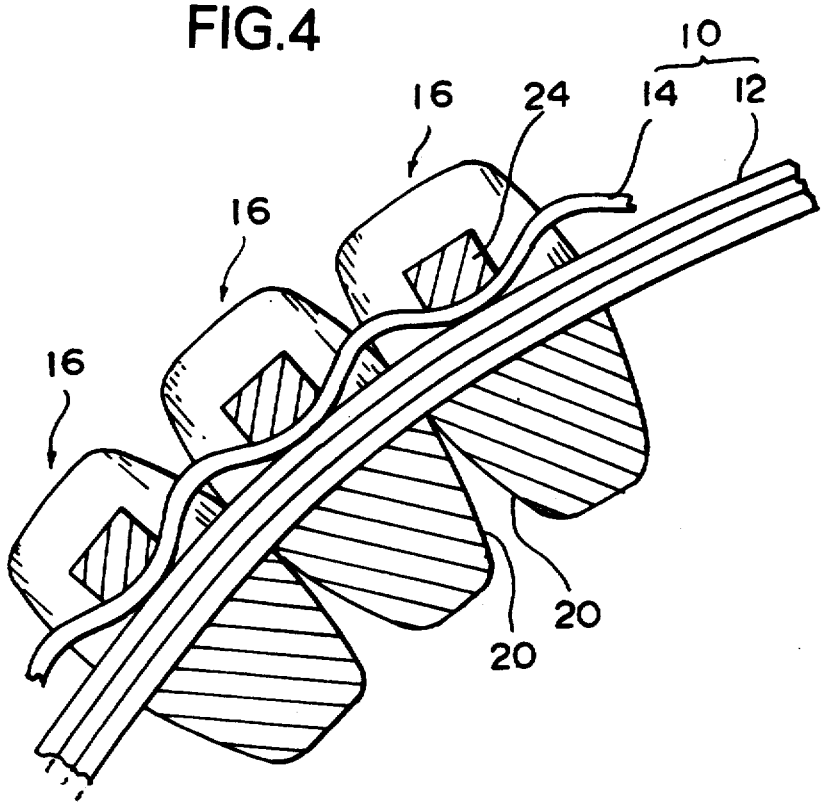
FIG. 4 is a fragmentary enlarged sectional view showing an essential part of the driving belt of FIG. 2 during passage through a pulley.

Now, a driving belt for stepless speed variation according to the present invention will be described hereinafter with reference to FIGS. 2 to 4, in which like reference numerals designate like parts throughout.

Figure 1:
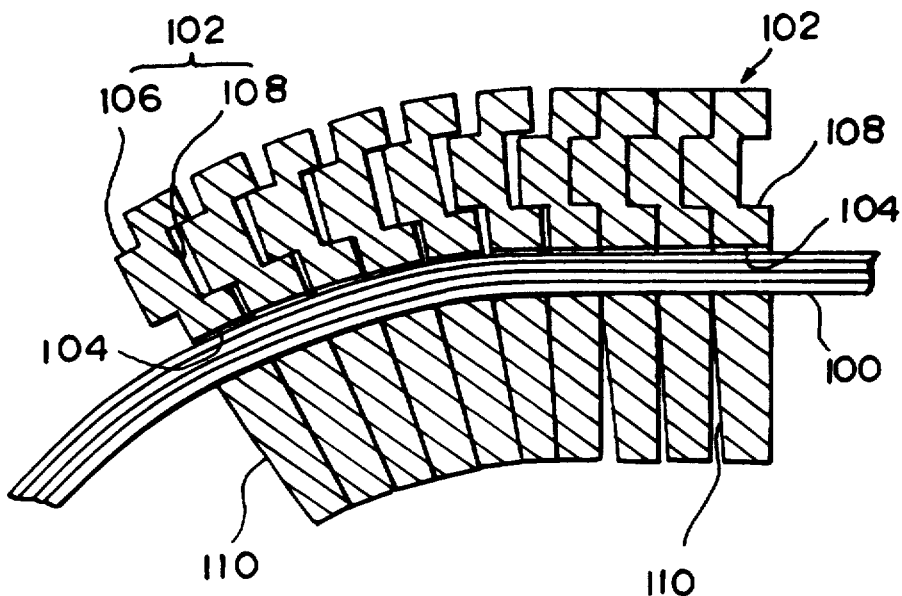
FIG. 1 is a fragmentary sectional view showing an essential part of a convention driving belt for stepless speed variation.
Figure 2:
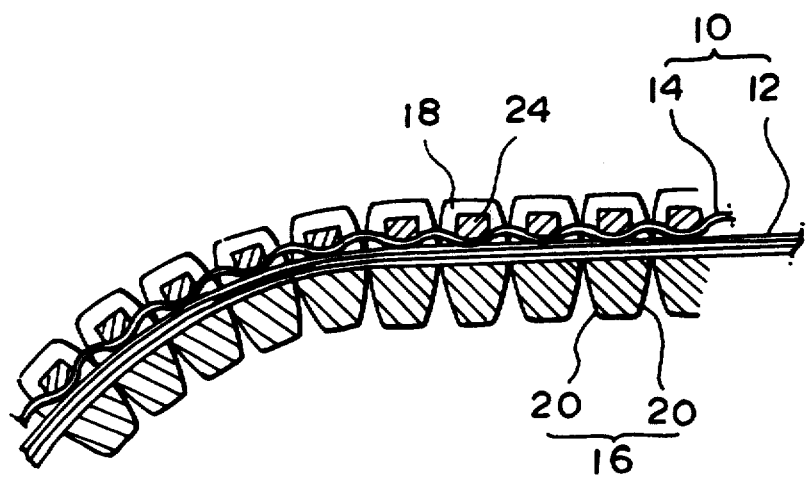
FIG. 2 is a fragmentary sectional view showing an essential part of an embodiment of a driving belt for stepless speed variation according to the present invention.

FIG. 2 illustrates an embodiment of a driving belt for stepless speed variation according to the present invention. A driving belt of the illustrated embodiment includes a metal strip 10. The metal strip 10 comprises a first metal strip element 12 and a second metal strip element 14 formed into a length larger than the first metal strip element 12. The first metal strip element may be formed of a single metal strip material. Alternatively, in the illustrated embodiment, it may be formed of a plurality of metal strip materials laminated on one another. The length of the second metal strip element 14 is defined to be sufficient to permit it to be curved into a corrugated shape when it is assembled in the belt. This can be previously determined by calculation. The driving belt of the illustrated embodiment also includes a plurality of blocks 16. The blocks 16 each are formed at a center of an upper portion thereof with a recess or groove 18 in or though which the metal strip 10 is fittedly mounted or inserted. Also, each of the blocks 16 is formed on both side surfaces thereof in a direction of advance of the belt into a curved shape which permits each of the side surfaces to be convex or outward projected at a central portion thereof, as indicated at reference numeral 20. The curved surfaces 20 of the block 16 are formed so as to have a center of curvature defined at an intermediate position of a depth of the groove 18. Each of the blocks 16 is also provided at the upper portion thereof which is formed with the above-described recess 18 with through-holes 22 in a manner to be aligned with each other through the groove 18, so that the through-holes 22 may communicate with each other with the groove 18 being interposed therebetween. In addition, the driving belt of the illustrated embodiment includes pins 24 each inserted into the through-holes 22 of each block 16. The pins 24 each are formed at a lower surface thereof into a curved shape as indicated at reference numeral 26. The metal strip 10 and blocks 16 may be made of any suitable material conventionally used for such a purpose.

Now, the manner of assembling of the driving belt of the illustrated embodiment constructed as described above will be described hereinafter.

First, a suitable number of the first metal strip elements 12 are laminated on each other and the second metal strip element 14 formed into a length longer than the elements 12 is provided. Then, one of the blocks 16 is fitted on the endless metal strip 10 formed of the first metal strip elements 12 and second metal strip element 14 in such a manner that a bottom surface of the groove 18 of the block 16 is abutted against a lower surface of the endless metal strip 10. Then, one of the pins 24 is inserted into the block 16 via the through-holes 22 of the block to downward press an upper surface of the second metal strip element 14, resulting in the block 16 being mounted on the metal strip 10. This causes each of the pins 24 arranged so as to extend across the groove 18 of the block 16. More specifically, each of the pins 24 is arranged at the upper portion of the groove 18 so as to transversely extend the groove. Then, another one of the blocks 16 is provided and fitted on the endless metal strip 10 so that a bottom surface of the groove 18 of the block 16 is abutted against the lower surface of the endless metal strip 10, and another pin 24 is inserted into the block 16 via one of through-holes 22 of the block to press a part of the second metal strip element 14. Under such conditions, the block 16 is forcibly moved toward the above-described block 16 already mounted on the metal strip 10 while holding an end of the second metal strip element 14, resulting in the two blocks being arranged in proximity to each other. Subsequently, the metal strip 10 is deformed into an arcuate shape between the two blocks to slacken the metal strip 10. Thereafter, the pin 24 is pushed into the other through-hole 22 of the block to mount the block 16 on the metal strip 10. The above-described procedure is repeated to mount a number of the blocks 16 on the metal strip 10 without any clearance. The blocks 16 thus mounted are continuously arranged on the endless metal strip 10 while each adjacent two blocks are kept abutted through the curved side surfaces 20 against each other. Further, the second metal strip element 14, as described above, is curved into a substantially corrugated shape which permits it to exhibit elastic force acting on the blocks 16.

Now, the manner of operation of the driving belt of the illustrated embodiment will be described hereinafter with reference to FIG. 4 as well as FIGS. 2 and 3.

When the blocks 16 linearly traveling approach a pulley (not shown), they start to incline. The blocks 16 adjacent to each other are abutted against each other through the curved side surface 20 of the adjacent blocks 16 opposite to each other in the direction of advance of the belt and such abutment between the blocks 16 is carried out near the metal strip 10, so that a position on the curved side surfaces at which the blocks 16 are abutted against each other is smoothly displaced or varied depending on an arcuation or curvature of the metal strip 10. This permits the blocks adjacent to be abutted against each other in substantially the same manner as during the linear traveling, also when the blocks curvedly travel around the pulley. Thus, the driving belt of the illustrated embodiment substantially eliminates generation of slippage as encountered with the conventional driving belt employing the plate-like blocks, to thereby significantly restrain energy loss and generation of frictional heat, resulting in improving power transmission efficiency.

Also, the arrangement of the second metal strip element 14 while keeping it into a corrugated shape permits it to exhibit elastic force, so that the blocks 16 may be positively connected to the metal strip 10 without a necessity of providing clearance between the metal strip 10 and the grooves 18 and forming the metal strip 10 and grooves with high accuracy, resulting in the driving belt being prevented from rolling while meandering, as well as from excessively vibrating. This prevents generation of noise, reduces wearing and damaging of the driving belt, and permits effective and positive power transmission to be quietly accomplished and smooth traveling of the belt to be ensured, to thereby improve endurance of the belt and pulley.

Moreover, in the illustrated embodiment, the second metal strip element 14 of a corrugated shape is stretched when the belt passes through the pulley, so that the blocks 16 are permitted to constantly abut against each other without producing any play or backlash therebetween, leading to elimination of slippage of the blocks during passage of the blocks through or around the pulley.

As can be seen from the foregoing, the driving belt for stepless speed variation according to the present invention substantially eliminates slippage and rolling of the belt while meandering as encountered with the prior art, to thereby restrain generation of noise and ensure smooth traveling of the belt. Also, this minimizes generation of frictional heat and reduces energy loss to permit power transmission to be accomplished with high efficiency.

As described above, the conventional driving belt causes interference between the carriers to occur during passage of the carriers around the pulley. The present invention substantially prevents such interference to ensure that power transmission is quietly accomplished to increase endurance of the parts.

Furthermore, the driving belt of the present invention is free of parts which require any clearance, to thereby be manufactured simply and at low costs.

Moreover, in the present invention, it is never required to provide clearance with respect to a longitudinal direction of the metal strip, to thereby highly decrease vibration of the belt.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A driving belt for stepless speed variation comprising:
    an endless metal strip including at least one first metal strip element and a second metal strip element formed into a length larger than said first metal strip element;
    a plurality of blocks each provided at a center of an upper portion thereof with a groove through which said belt is fittedly inserted and having both surfaces in a direction of advance of said driving belt curved; and
    a plurality of pins each arranged so as to extend across said groove of said block.

2. A driving belt as defined in claim 1, wherein said second metal strip element is formed into a corrugated shape.

3. A driving belt as defined in claim 1, wherein said both surfaces of said block each have a center of curvature defined at an intermediate position of a depth of said groove.

4. A driving belt as defined in claim 1, wherein said both surfaces of said block are convexly curved.

5. A driving belt as defined in claim 1, wherein said second metal strip element is arranged between said pins and said first metal strip element.

6. A driving belt as defined in claim 1, wherein said pins each are inserted into said block through said groove to downward press said metal strip received in said block.

* * * * *

UNITED STATES PATENT AND TRADEMARK OFFICE
CERTIFICATE OF CORRECTION

PATENT NO. : 5,236,401
DATED : August 17, 1993
INVENTOR(S) : Mu Matsuo

It is certified that error appears in the above—identified patent and that said Letters Patent is hereby corrected as shown below:

On the title page, insert:

Item: [30]    Foreign Application Priority Data
              April 25, 1991 [JP]   Japan.........3-38003

Signed and Sealed this

Eighth Day of March, 1994

Attest:

BRUCE LEHMAN

*Attesting Officer*     *Commissioner of Patents and Trademarks*